(12) United States Patent
Furuta et al.

(10) Patent No.: US 7,057,367 B2
(45) Date of Patent: Jun. 6, 2006

(54) TWO-LEG WALKING HUMANOID ROBOT

(75) Inventors: Takayuki Furuta, Tokyo (JP); Tetsuo Tawara, Tokyo (JP); Yu Okumura, Kanagawa (JP); Hiroaki Kitano, Saitama (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 10/504,693

(22) PCT Filed: Feb. 7, 2003

(86) PCT No.: PCT/JP03/01326

§ 371 (c)(1),
(2), (4) Date: Aug. 16, 2004

(87) PCT Pub. No.: WO03/068454

PCT Pub. Date: Aug. 21, 2003

(65) Prior Publication Data

US 2005/0151496 A1 Jul. 14, 2005

(30) Foreign Application Priority Data

Feb. 18, 2002 (JP) ............................. 2002-040839

(51) Int. Cl.
*B25J 13/00* (2006.01)
(52) U.S. Cl. ..................... 318/568.12; 318/568.22; 318/611; 318/632
(58) Field of Classification Search ........... 318/568.11, 318/568.12, 568.2, 568.22, 611, 623, 625, 318/632, 646; 901/9, 27, 28, 48, 49
See application file for complete search history.

(56) References Cited

U.S. PATENT DOCUMENTS 5,369,346 A * 11/1994 Takahashi et al. ...... 318/568.17
5,432,417 A    7/1995 Takenaka et al.

(Continued)

FOREIGN PATENT DOCUMENTS

EP         1 018 467         7/2000

(Continued)

*Primary Examiner*—Bentsu Ro
(74) *Attorney, Agent, or Firm*—Westerman, Hattori, Daniels & Adrian, LLP.

(57) ABSTRACT

It is a biped (two-footed) walking humanoid robot, which is provided with drive motors (11*d*, 11*e*, 18L, 18R-24L, 24R, 28L, 28R-33L, 33R, 35, 36) to pivotally move respective joint portions, and a motion control apparatus (40) to drive-control respective drive motors, and said motion control apparatus (40), together with a detector (45) to detect the robot's current posture and others, compares the robot's detected current posture and others with next motion command input from outside, and if next motion command is within the range of stability limit with respect to the robot's current posture and others, the complementary data with respect to intermediate motion from current posture till initial posture of next motion command and the motion data corresponding to next motion command are generated, each drive motor is drive-controlled based on said complementary and motion data, and thereby various motions are conducted smoothly and continually. It is preferably provided with a motion library (41*a*) storing time series data of basic motions as the elements of the robot's motions and posture data consisting of algorithm, reads out the corresponding posture data from said motion library, and generates complementary and motion data as the combined motion sequence.

13 Claims, 8 Drawing Sheets

U.S. PATENT DOCUMENTS

| | | | | |
|---|---|---|---|---|
| 5,936,367 A | * | 8/1999 | Takenaka | 318/568.12 |
| 6,243,623 B1 | * | 6/2001 | Takenaka et al. | 700/245 |
| 6,898,485 B1 | * | 5/2005 | Kuroki et al. | 700/245 |
| 6,901,313 B1 | * | 5/2005 | Mori et al. | 700/245 |
| 6,902,015 B1 | * | 6/2005 | Furuta et al. | 180/8.6 |
| 6,943,520 B1 | * | 9/2005 | Furuta et al. | 318/568.12 |

FOREIGN PATENT DOCUMENTS

| | | |
|---|---|---|
| JP | 5-62363 | 9/1993 |
| JP | 7-205069 | 8/1995 |
| JP | 11-320460 | 11/1999 |
| JP | 2001-212775 | 8/2001 |
| JP | 2001-277163 | 10/2001 |

* cited by examiner (A)

(B)

TWO-LEG WALKING HUMANOID ROBOT

TECHNICAL FIELD

The present invention relates to a biped (two-footed) walking humanoid robot, and more specifically to a biped (two-footed) walking humanoid robot capable of conducting various motions smoothly and continually.

BACKGROUND ART

A conventional biped walking humanoid robot generates the pre-designed walk pattern (hereinafter to be called "gait") data, conducts walk control according to the gait data, moves leg portions by the pre-designed walk pattern, and thereby realizes biped walking. Here, in order to stabilize walk posture, stabilization of the robot is targeted by ZMP regulation by what is called ZMP Compensation, whereby a point on the sole of a foot of the robot where the composite momentum of floor reaction force and gravity becomes zero is converged to the target value.

Incidentally as a biped walking humanoid robot's motions, in addition to walking, uprising motion without walking, so-called rotational motions to change direction, or stand up motion from sitting posture on a chair, and others can be mentioned. In order to realize a more practical humanoid robot, such various motions have to be conducted quickly and smoothly.

However, such motions are designed to be conducted independently of one another, and, in case respective motions are conducted in series, they are not continuous and smooth in general. Especially, continuation of quick motions tends to cause the robot's tumbling down due to unbalancing caused by inertial force generated from respective motions. For this reason, conventional biped walking humanoid robots are controlled, after one motion is completed, to stop once, and slowly move to another motion, thereby their motions look quite mechanical.

Further conventional biped walking humanoid robot are in many cases operated by an operator with outside control system for convenience and real time motions, for which menu display, operation buttons, or joysticks are provided to the control system for choosing motion, and the motion for the robot to conduct is chosen by using said parts. Therefore, when the operator chooses next motion for the robot to conduct and the robot conducts the chosen next motion, the robot may tumble down by unbalancing, or the drive means to drive its each part may be overloaded by unnatural posture. Thus, it has so far been difficult for a biped walking humanoid robot to conduct various motions continually and smoothly.

DISCLOSURE OF THE INVENTION

It is the objective of the present invention, taking into consideration the above-mentioned problems, to provide a biped walking humanoid robot capable of easily conducting various motions continually and smoothly.

The above-mentioned objective is achieved in accordance with the present invention with the biped walking humanoid robot, which comprises a body portion, a pair of leg portions attached at both sides of the lower part of said body portion each pivotally movable, each of the leg portions having a knee portion in its midway and a foot portion at its lower end, a pair of arm portions attached at both sides of the upper part of said body portion each pivotally movable, each of the arm portions having an elbow portion in its midway and a hand portion at its lower end, and a head portion attached on top of said body portion, the drive means to pivotally move the pivotally movable joint portions of the foot, lower thigh, and thigh portions of said leg portions, and the hand, lower arm, and upper arm portions of said arm portions, and the motion control apparatus to drive-control each drive means, characterized in that said motion control apparatus, together with a detector to detect the robot's current posture and others, compares the robot's current posture and others detected by said detector with next motion command input from outside, and if next motion command is within the range of stability limit with respect to the robot's current posture and others, then motion data is generated corresponding to next motion command, and each drive means is drive-controlled based on said motion data.

In accordance with the above-described aspect, for a biped walking humanoid robot to conduct various motions continually, only when next motion command is within the range of stability limit, motion data corresponding to next motion command is generated. Therefore, by said motion control apparatus drive-controlling the robot's each portion based on said motion data, the robot can conduct the motion by next motion command from the current posture, and continuous motion can be conducted smoothly and stably.

Also since, only when next motion command is within the range of stability limit, the robot conducts the motion corresponding to next motion command, even if an operator to operate the robot is unaccustomed, the suitability and unsuitability of each continued motion are not required to be judged by the operator by combination of various motions by the robot operation, therefore easy operation of complex continuous motion is possible, and thereby conduction of unsuitable motion by wrong operation by the operator can be prevented.

A biped walking humanoid robot in accordance with the present invention is preferably such that said motion control apparatus compares the robot's current posture and others detected by the detector and next motion command input from outside, and if next motion command is within the range of stability limit with respect to the robot's current posture and others, then complementary data with respect to the intermediate motions from the robot's current posture till the initial posture of said next motion command and motion data corresponding to next motion command are generated, and each drive means is drive-controlled based on said complementary and motion data.

Thus, a robot, with its motion control apparatus drive-controlling its each part based on said complementary and motion data, conducts the motion by next motion command from the current posture via the intermediate motion. Therefore, since a robot conducts the motion by next motion command from the terminal position of the previous motion via the intermediate motion by complementary motion, continuous motion can be conducted smoothly and stably.

A biped walking humanoid robot in accordance with the present invention is preferably such that said motion control apparatus is provided with a motion library storing any combination of time-series data of basic motions, and posture data generating algorithm, as the elements of the robot's motions, and, upon generating complementary and motion data with respect to the intermediate motion from the robot's current posture till the initial posture of next motion command, reads out the corresponding posture data from the motion library, and generates complementary and motion data as the combined motion sequence.

According to the above-described aspect, since the posture data of basic motions is stored in motion library as the decomposed elements of the robot's various motions, the motion control apparatus can, upon generating complementary and motion data, generate desired complementary and motion data by reading out on real time and combining posture data from motion library as the elements of basic motions. Thus, since various motions are realized by real time combination of basic motions, in case that a robot is actually operated under the same circumstance as human beings, that is, the circumstance where the predicted conditions and reality do not necessarily agree because the circumstance varies irrelevantly with the robot operation, and also it varies due to the robot's own action, the robot can react flexibly to the condition of the case. Further, the volume of calculation by the motion control apparatus is reduced, thereby quick generation of complementary and motion data is possible.

A biped walking humanoid robot in accordance with the present invention is preferably such that said motion control apparatus is provided with memory means to memorize the motion commands from outside, and, with respect to the frequently designated specific continuous motion command, stores its posture data as new basic data into motion library. In this case, when a group of the frequently designated specific continuous motion command is input from outside, the posture data corresponding to said group of motion command stored in motion library can be read out, and can be made motion data as it is. Therefore, the calculation of the combined sequence of basic motions becomes unnecessary, and the motion data corresponding to a group of said motion command can be generated easily and quickly.

A biped walking humanoid robot in accordance with the present invention is preferably such that said motion control apparatus does not generate motion data based on next motion command, and does not conduct said motion, if next motion command is outside of the range of stability limit with respect to the robot's current posture and others. Thus, by not conducting the motion with respect to motion command outside of the range of stability limit for the robot's current posture and others, it can be prevented in advance for a robot to be unstable and tumble down by the motion corresponding to next motion command.

A biped walking humanoid robot in accordance with the present invention is preferably such that said motion control apparatus, if next motion command is outside of the range of stability limit with respect to the robot's current posture and others, indicates another motion to outside within the range of stability limit with respect to the robot's current posture and others. Therefore, in case that next motion command input from outside is outside of the range of stability limit with respect to the robot's current posture and others so that said motion is not conducted, by indicating another motion possible, for example, to the robot operator, said operator can choose appropriate motion out of the indicated motions for substitution, and input new next motion command to the robot.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and an understanding thereof, in which drawings.

BEST MODES FOR CARRYING OUT THE INVENTION

Hereinafter, the present invention will be described in detail with reference to suitable forms of embodiment thereof illustrated in the figures.

Figure 1:
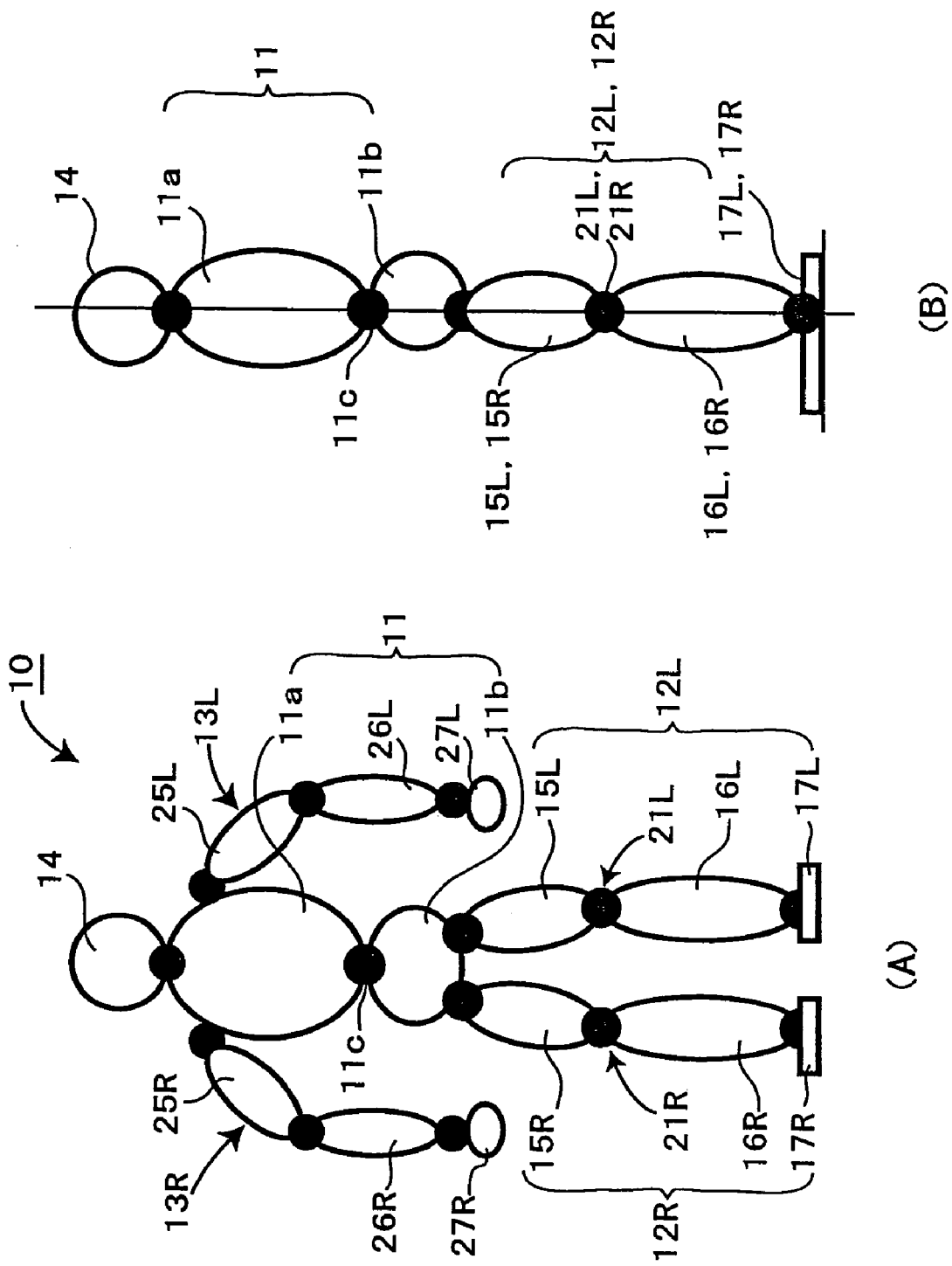
FIG. 1 illustrates an outlook of a biped walking humanoid robot according to the present invention as one form of embodiment thereof, in which (A) is a schematic front view, and (B) is a schematic side view.
Figure 2:
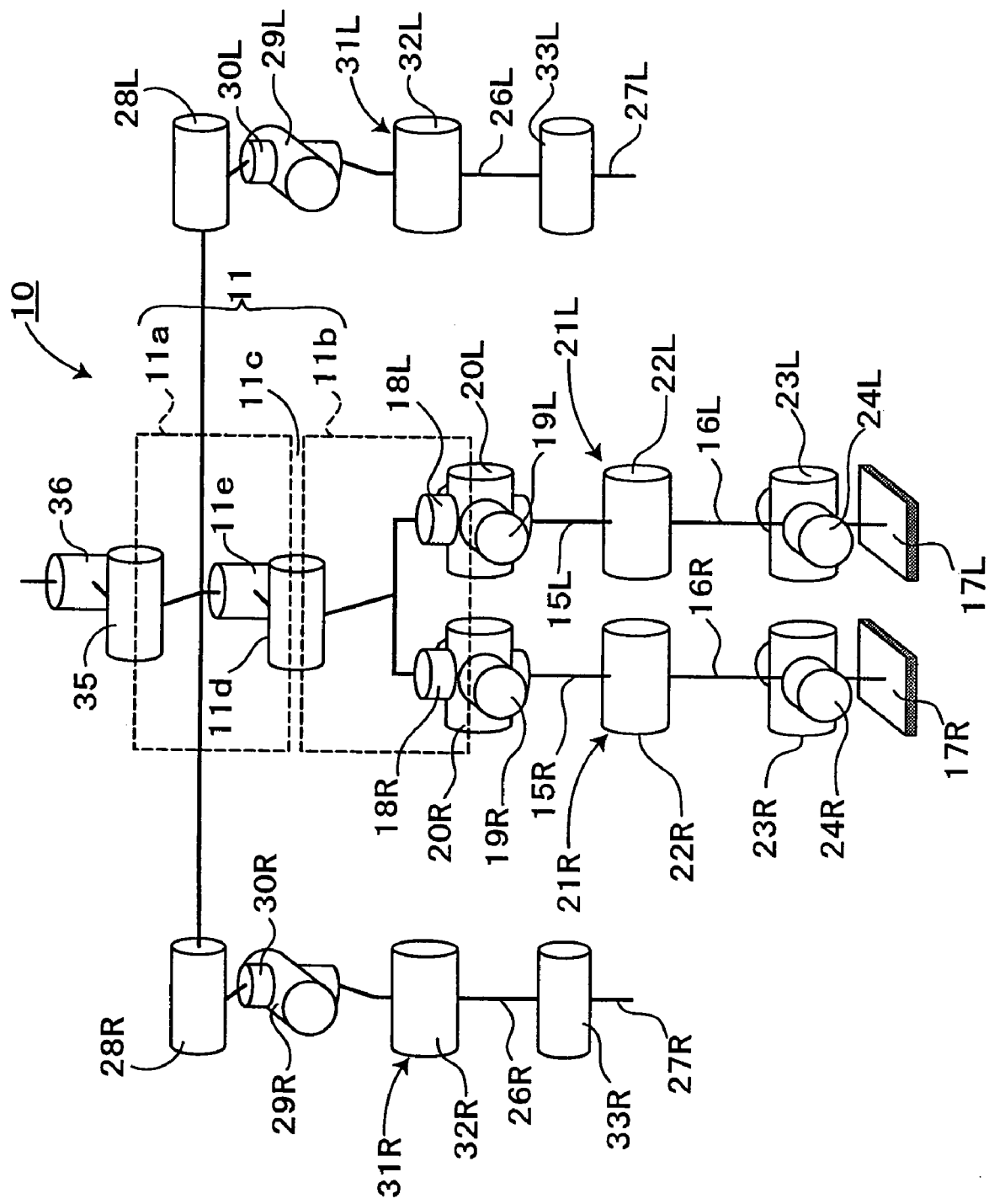
FIG. 2 is a block diagram illustrating the mechanical makeup of a biped walking humanoid robot shown in FIG. 1.

FIG. 1 and FIG. 2 show the makeup of an embodiment of a biped walking humanoid robot in accordance with the present invention. Referring to FIG. 1, a biped walking humanoid robot 10 includes a body portion 11, a pair of leg portions 12L and 12R attached to both sides of the lower part of the body portion 11, a pair of arm portions 13L and 13R attached to both sides of the upper part of the body portion, and a head portion 14 attached to the top of the body portion.

The body portion 11 is divided to a breast portion 11a as an upper part and a waist portion 11b as a lower part, and the breast portion 11a is supported at a forward bending portion 11c pivotally movably in the forth and back direction with respect to the waist portion 11b, and especially forward direction, and rotationally left and right. Further, in the breast portion 11a of the body portion 11, a walk control apparatus 50 is contained as described below. The forward bending portion 11c is provided with a joint portion 11d for forth and back pivotal movement and a joint portion 11e for rotation left and right, and each joint portion 11d and 11e comprises a joint drive motor (See FIG. 2.), respectively.

The leg portions 12L, 12R are made up with thigh portions 15L, 15R, lower thigh portions 16L, 16R, and foot portions 17L, 17R. The leg portions 12L, 12R are provided, as shown in FIG. 2, with six joint portions, respectively, in the order from upper side, joint portions 18L, 18R for the rotation of the leg portions with respect to the waist portions 11b of the body portion 11, joint portions 19L, 19R in the roll direction (around x axis) of the leg portions, joint portions 20L, 20R in the pitch direction (around y axis) of the leg portions, joint portions 22L, 22R in the pitch direction of knee portions 21L, 21R connecting thigh portions 15L, 15R and lower thigh portions 16L, 16R, joint portions 23L, 23R in the pitch direction of ankle portions with respect to the foot portions 17L, 17R, and joint portions 24L, 24R in the roll direction of the ankle portions. Here, each joint portion 18L, 18R to 24L, 24R comprises a joint drive motor, respectively.

Thus, a waist joint is made up with the joint portions 11$d$, 11$e$, and a hip joint is made up with the joint portions 18L, 18R, 19L, 19R, 20L, and 20R, and foot joints are made up with the joint portions 23L, 23R, 24L, and 24R. Accordingly, the leg portions 12L, 12R on both sides, left and right, of the biped walking humanoid robot 10 have six degrees of freedom, respectively, and it is made capable of walking at will in a three dimensional space by drive-controlling these twelve joint portions during various motions with respective drive motors at appropriate angles, and by giving desired motions to whole leg portions 12L, 12R.

The arm portions 13L, 13R are made up with upper arm portions 25L, 25R, lower arm portions 26L, 26R, and hand portions 27L, 27R, respectively. The upper arm portions 25L, 25R of the arm portions 13L, 13R, the lower arm portions 26L, 26R, and the hand portions 27L, 27R are provided, as shown in FIG. 2 like above-mentioned the leg portions 12L, 12R, with five joint portions, respectively, in the order from upper side, joint portions 28L, 28R for the pitch direction of the upper arm portions 25L, 25R at shoulder parts with respect to the body portion 11, joint portions 29L, 29R in the roll direction of the upper arm portions 25L, 25R at shoulder parts, joint portions 30L, 30R in the left and right direction of the upper arm portions 25L, 25R at shoulder parts, joint portions 32L, 32R in the pitch direction of elbow portions 31L, 31R connecting the upper arm portions 25L, 25R and the lower arm portions 26L, 26R, and joint portions 33L, 33R in the pitch direction of the hand portions 27L, 27R at a wrist part with respect to the lower arm portions 26L, 26R. Here, each joint portion 28L, 28R to 33L, 33R comprises a joint drive motor, respectively.

Thus, the arm portions 13L, 13R on both sides, left and right, of the biped walking humanoid robot 10 have five degrees of freedom, respectively, and it is made capable of drive-controlling these twelve joint portions during various motions with respective drive motors at appropriate angles, and giving desired motions to whole arm portions 13L, 13R. Here, the rotation axis of the joint portions 28L, 28R in the pitch direction at said shoulder parts is set misaligned forward with respect to the joint portions 29L, 29R in the roll direction and the joint portions 30L, 30R in the left and right direction, and the swing angle forward of the arm portions 13L, 13R is designed larger.

The head portion 14 is attached on to the top end of the upper portion 11$a$ of the body portion 11, and is provided, for example, with a camera as visual perception and a microphone as auditory perception. The head portion 14 comprises, as shown in FIG. 2, a joint portion 35 in the pitch direction of a neck and a joint portion 36 in the left and right direction. Here, each joint portion 35, 36 are made up with respective joint drive motor.

Thus, the head portion 14 of the biped walking humanoid robot 10 has two degrees of freedom, and it is made capable of moving in the left and right and forth and back directions by drive-controlling these two joint portions 35, 36 during various motions with respective drive motors at appropriate angles. Here, the rotation axis of the joint portion 35 in the pitch direction is set misaligned forward with respect to the joint portion 36 in the left and right direction, and the pivotal angle forward of the head portion 14 is designed larger.

Figure 3:
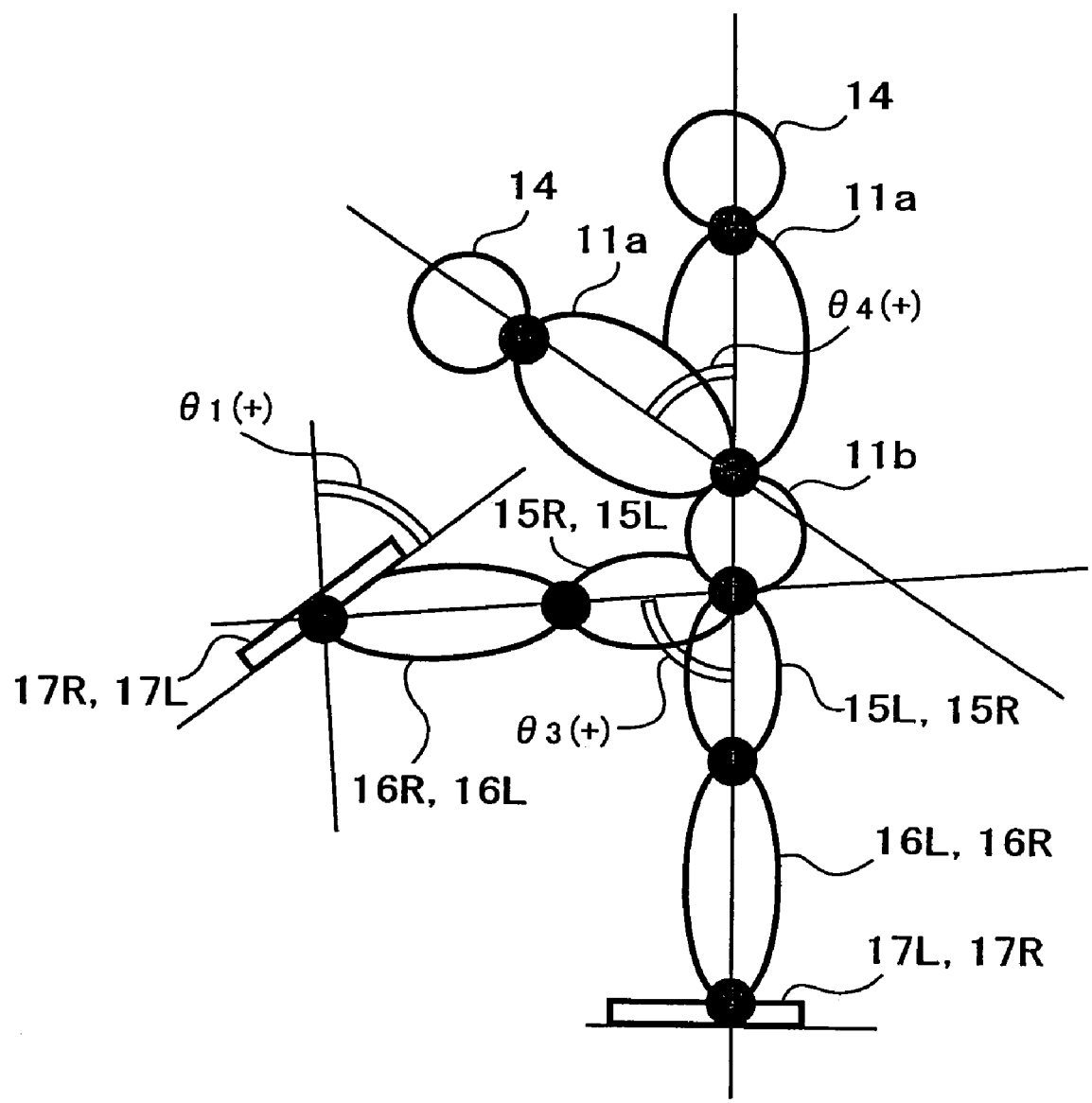
FIG. 3 is a schematic view illustrating the forward pivotal limit of the forward bending portion and each joint portion of leg portions of a biped walking humanoid robot shown in FIG. 1.
Figure 4:
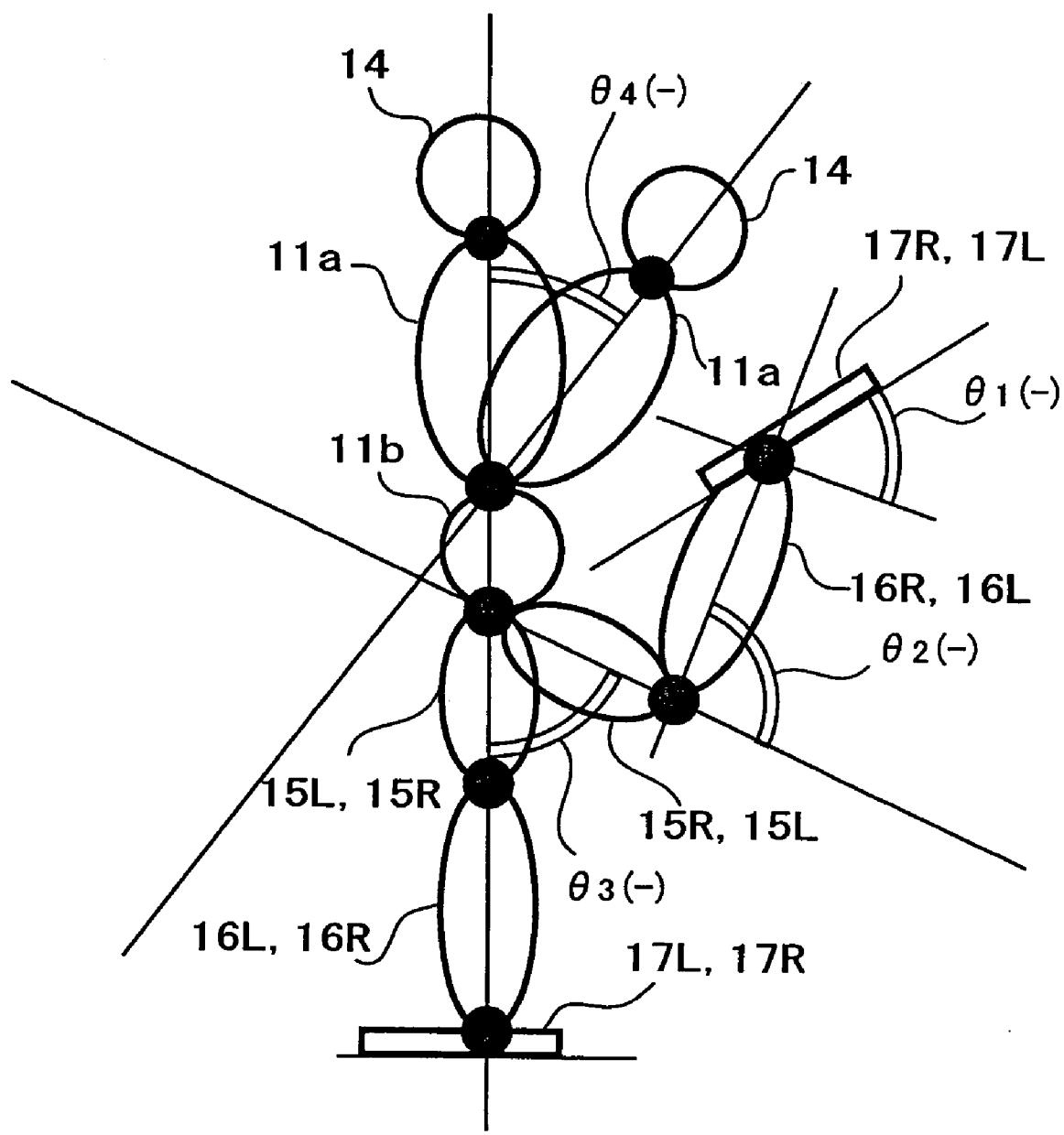
FIG. 4 is a schematic view illustrating the backward pivotal limit of the forward bending portion and each joint portion of leg portions of a biped walking humanoid robot shown in FIG. 1.
Figure 5:
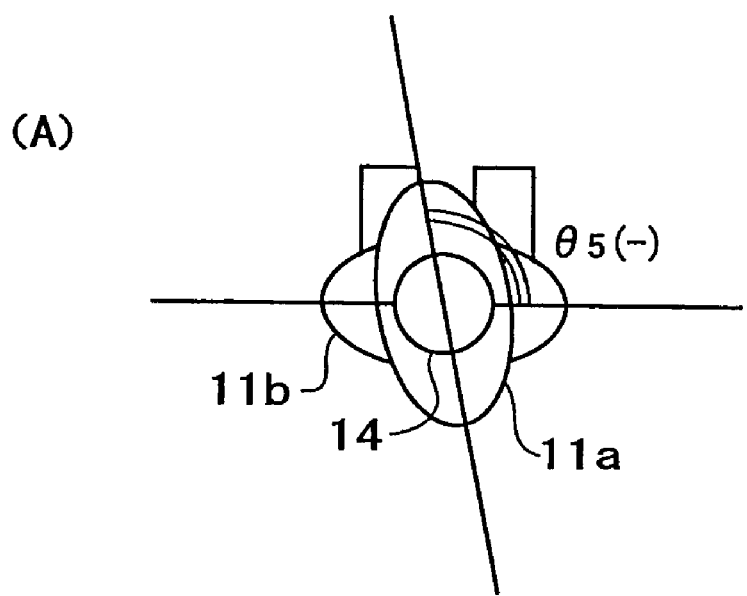
FIG. 5 is a schematic view illustrating each joint portion of the forward bending portion of a biped walking humanoid robot shown in FIG. 1, in which (A) shows the leftward rotational limit, and (B) shows the rightward rotational limit, respectively.
Figure 5:
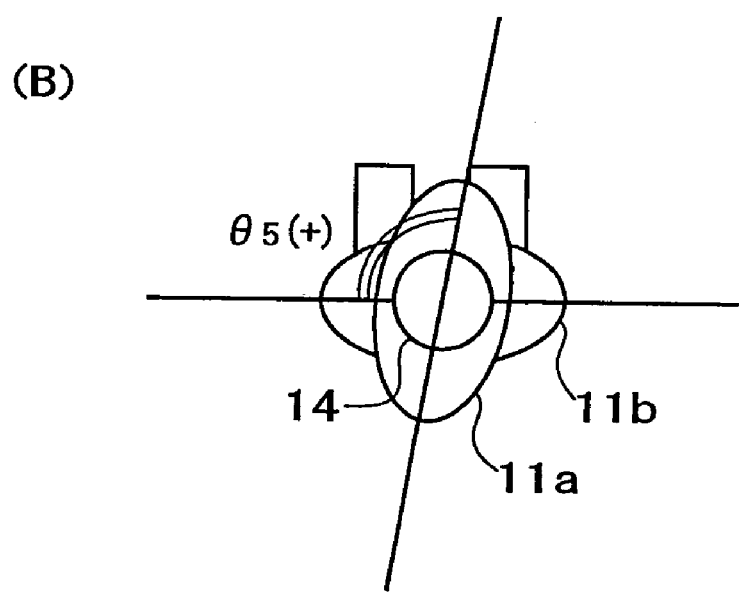

Further in the biped walking humanoid robot 10, the joint portion 11$d$ of the forward bending portion 11$c$ of the body portion 11, joint portions in the forth and back direction of the leg portions 12L, 12R, that is, the joint portions 20L, 20R of the hip joint, the joint portions 22L, 22R of the knee portions, and the joint portions 23L, 23R of the ankle portions are supported pivotally movably in the angle range shown in FIG. 3 and FIG. 4. The joint portions 23L, 23R of the ankle portions are capable of pivotally moving in the angle range where its pivotal angle θ1 is −20 to +20 degrees or more. The joint portions 22L, 22R of the knee portions are capable of pivotally moving in the angle range where its pivotal angle θ2 is −120 to 0 degrees or more. The joint portions 20L, 20R of the waist portions are capable of pivotally moving in the angle range where its pivotal angle θ3 is −45 to +60 degrees or more. The forward bending portion 11$c$ of the body portion 11 is also capable of pivotally moving in the angle range where its pivotal angle θ4 is −10 to +60 degrees or more. On the other hand, the joint portion 11$e$ of the forward bending portion 11$c$ of the body portion 11 is supported pivotally movably in the angle range as shown in FIG. 5. That is, the joint portion 11$e$ of the forward bending portion 11$c$ of the body portion 11 is capable of pivotally moving in the angle range where its pivotal angle θ5 is −45 degrees or more in the left-side direction shown in FIG. 5(A), and +45 degrees or more in the right-side direction shown in FIG. 5(B).

Figure 6:
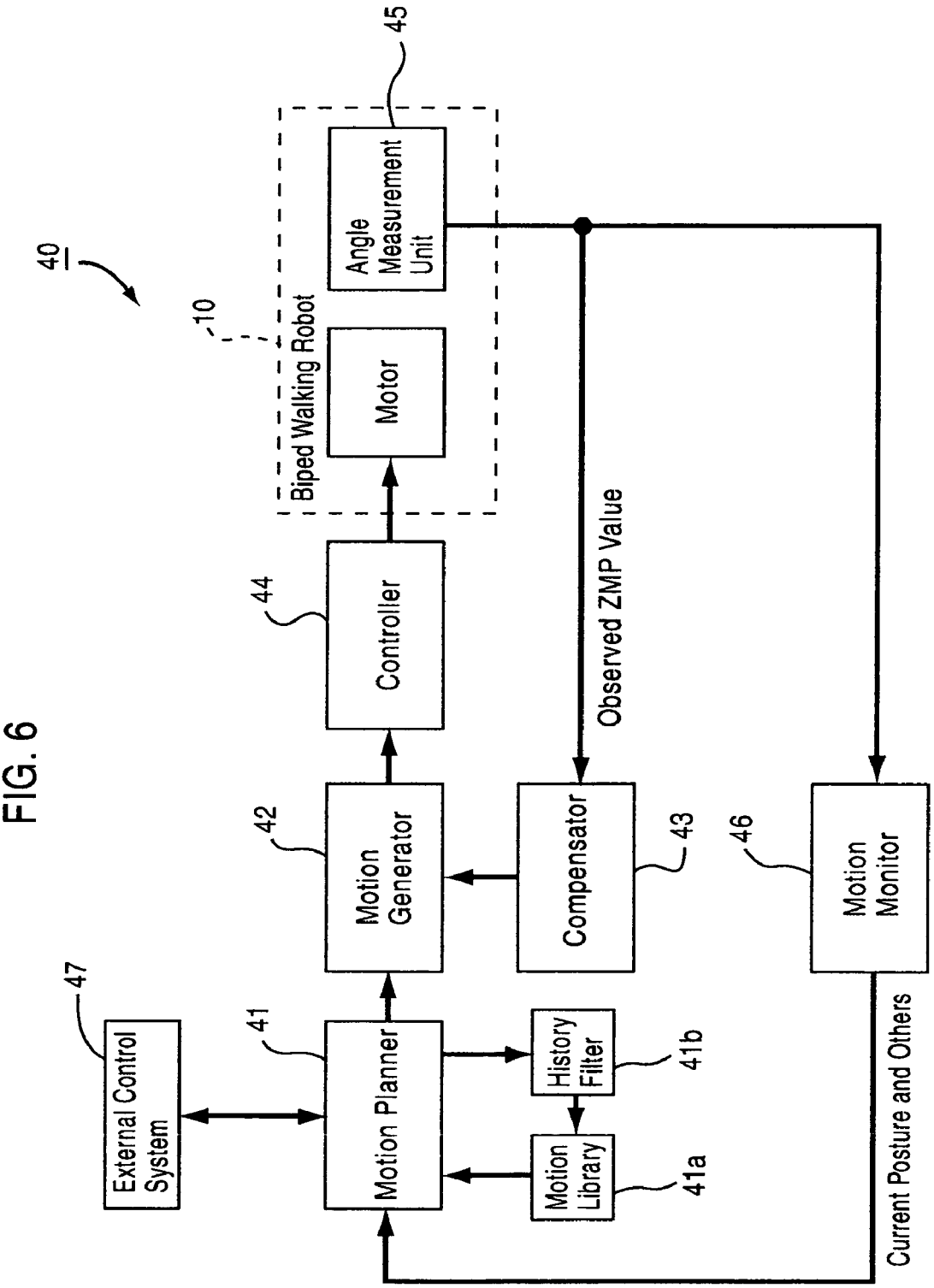
FIG. 6 is a block diagram illustrating the electrical makeup of a biped walking humanoid robot shown in FIG. 1.

FIG. 6 shows the electrical makeup of the biped walking humanoid robot 10 shown in FIG. 1 to FIG. 5. In FIG. 6, the biped walking humanoid robot 10 is provided with a drive means, that is, a motion control apparatus 40 to drive-control the above-mentioned respective joint portions, that is, the joint drive motors 11$d$, 11$e$, 18L, 18R to 36.

The motion control apparatus 40 is provided with a motion planner 41, a motion generator 42, a compensator 43, a controller 44, an angle measurement unit 45 as a detector to detect angles of respective joint portions of the robot, a ZMP detection sensor (not shown in the figure) provided to the foot portions 17L, 17R, and a motion monitor 46. Here, as a coordinate system of the biped walking robot 10, xyz coordinate system is used in which the forth and back direction is defined as x direction (forth as +), the horizontal direction as y direction (inward as+) and the vertical direction as z direction (upward as +).

The motion planner 41 plans the motions corresponding to the motion commands based on next motion command input from outside. That is, the motion planner 41 calculates the angular momentum of each portion of the robot required for the motion corresponding to said motion command, and makes up a robot's motion path, that is, the motion plan. Here, in the motion planner 41, a robot's current posture and others are input from the motion monitor 46 as described below, and the robot's current posture and others are referred to upon making up of the motion plan. As the motion command input from outside, arbitrary motion command can be chosen by the operator, for example, using a joystick, a mouse, or an operation button in the external control system 47. The motion planner 41 preferably displays, as described below, the motion to be currently chosen by the screen display or others on the external control system 47, referring to the robot's current posture and others.

Here, the motion planner 41 is provided with a motion library 41$a$. The motion library 41$a$ stores in advance the posture data and others of basic motions as the elements of a robot's motion as the database according to classifications. The posture data is the program to generate the time-series data and motion of a robot's joint parameters. And the posture data includes the auxiliary description about motion, for example, the time to be spent, a robot's part on which the motion is applied, and the basic object of use of the motion, and others, and accordingly, a robot can judge the additional information which is essentially understood by humans. The posture data also includes the surrounding conditions (for example, the hindrance in front during walk forward, and the like) required to conduct motions, and the stability indices (for example, ZMP and the position of center of gravity, and the like) upon start and finish of a robot's motions. The posture data further includes main parameter and its variable range and other, if the motion is not fixed motion but the output is variable by adjusting the parameter. Here, the auxiliary description means, for example, standup motion, rotational motion, and stepping motion, and others as possible motions in currently sitting down state.

Accordingly, the motion planner 41 chooses and reads out various necessary posture data and others from the motion library 41a upon the above-mentioned motion planning, generates motion plan as the sequence of combined motions, and outputs posture data of each sequence as motion plan to the motion generator 42. In this case, a robot's current posture and others are input from the motion monitor 46, and the motion planner 41 compares the robot's current posture and next motion command upon conducting motion plan, and judges if it is possible to conduct the motion by next motion command within the stability range from the robot's current posture and others. In this case, the motion planner 41 can easily judge by referring to the auxiliary description of respective motion data stored in the motion library 41a. And if the motion by next motion command is out of stability range, then the motion planner 41 does not conduct the motion plan based on the next motion command, but denotes the motion to be chosen by the robot's current posture and others to the outside control system, for example, on screen display or others. If, on the other hand, the motion by next motion command is within stability range, then the motion planner 41 judges whether transfer is possible to the motion by next motion command from the robot's current posture. In this case, too, the motion planner 41 can easily judge likewise by referring to the auxiliary description of respective motion data stored in the motion library 41a.

In case that the motion can be stably transferred by next motion command, the motion planner 41 reads out the corresponding posture data from the motion library 41a based on next motion command, and generates motion plan. On the other hand, in case that the motion can not be stably transferred by next motion command, the motion planner 41 conducts complementary calculation with respect to the intermediate motion from the robot's current posture till the initial state of the motion by next motion command, or reads out the posture data corresponding to the intermediate motion from the motion library 41a, and generates motion plan for complementary motion, as well as reads out the corresponding posture data from the motion library 41a based on the motion by next motion command and generates motion plan, and outputs the motion plan for both complementary motion and the motion by next motion command to the motion generator 42. Here, the posture data about the above-mentioned complementary motion includes auxiliary description as to whether usable for, for example, the transfer from certain posture to another posture. Further, the motion planner 41 records the motion command from outside into a history filter 41b as a memory device. Accordingly, the history filter 41b, upon inputting a group of motion commands about a plurality of frequently continuing motions, registers the motion by such group of motion commands into the motion library 41a as a new basic motion.

The motion generator 42 generates angle data, as motion data, of respective joint portions 15L, 15R to 36 required for the motion of the biped walking humanoid robot 10. In this case, the motion generator 42 modifies internal parameters and angle data base on the command, as described later, from the compensator 43.

The compensator 43 calculates ZMP (Zero Moment Point) target value based on the angle data θref of respective joint portions from the motion generator 42, as well as ZMP real value based on the posture information from an angle measurement unit 45 and the detected output from the ZMP detection sensor. And the compensator 43 compares the ZMP real value with ZMP target value, calculates ZMP compensation based on their difference, and outputs it to the motion generator 42. Here, the motion generator 42, with ZMP compensation fed back from the compensator 43, modifies motion data based on said ZMP compensation, and outputs it to the controller 44. The controller 44 generates the control signals for respective joint drive motors based on the modified motion data from the motion generator 42, and drive-controls respective joint drive motors.

The angle measurement unit 45, with the angle information of respective joint drive motors input by, for example, a rotary encoder or the like provided to joint drive motors of respective joint portions 11d, 11e, 18L, 18R to 36, measures the angle positions of respective joint drive motors, that is, the state information about angle, angle velocity, and rotation moment, that is, the posture information θ real of the robot 10, and outputs it to the compensator 43 and the motion monitor 46.

The motion monitor 46, with motion plan from the motion planner 41, ZMP target value from the compensator 43, and the angle information as ZMP real value (including angle and angle moment) from angle measurement unit 45 and ZMP detection sensor input thereinto, always monitors the state of the biped walking humanoid robot 10 based on these data. And the motion monitor 46 feeds back motion plan, the deviation of a robot's real motion from ZMP target value, and a robot's current posture and others to the motion planner 41. Further, the motion monitor 46, when a robot's state becomes unstable, commands compensation or termination of motion for stabilization to the motion planner 41.

Figure 7:
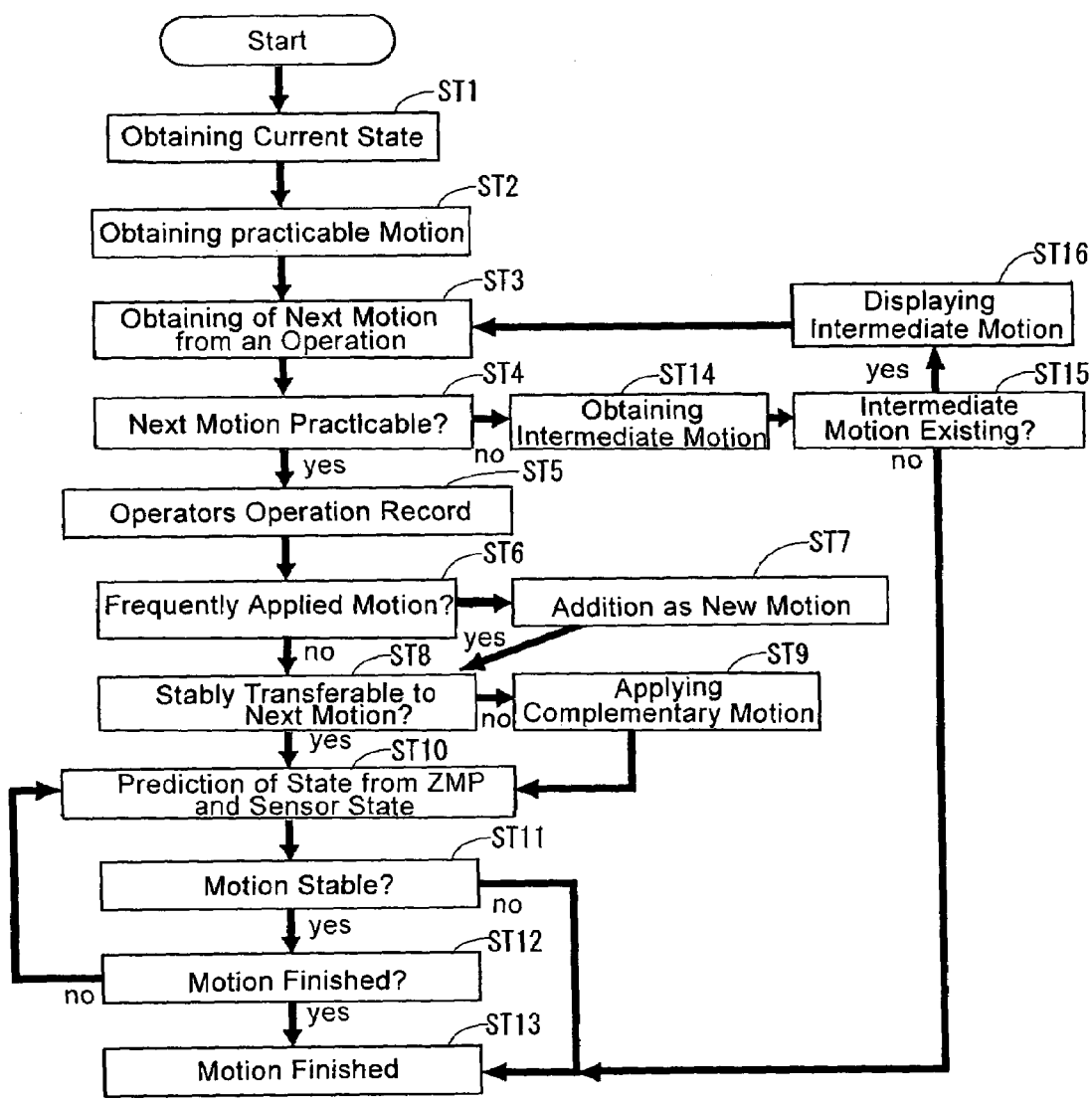
FIG. 7 is a flowchart illustrating the motion control of a biped walking humanoid robot shown in FIG. 1.

The biped walking humanoid robot 10 in accordance with embodiments of the present invention is made up as described above, and moves as shown in the flowchart of FIG. 7. First of all at step ST1, the motion planner 41 takes up a robot's current posture and others from the motion monitor 46, takes up practicable motion corresponding to a robot's current posture and others from the motion library 41a at step ST2, and denotes these motions to the controller 47. And the motion planner 41 takes up at step ST3 the motion command about next motion input from a controller 47 by an operator, and the motion planner 41 judges at step ST4 if said next motion command is practicable within the stability range in comparison with a robot's current posture and others.

Here, in case within the range of stability limit, the motion planner 41 registers at step ST5 said next motion command to the history filter 41b, and at step ST6, judges whether said next motion command is the motion frequently applied. If the next motion command is the motion frequently applied, the motion planner 41 registers additionally at step ST7 said next motion command which was registered to the history filter 41b to the motion library 41a as a new basic motion.

After that, the motion planner 41 proceeds on to step ST8. On the other hand, if the next motion command is not the motion frequently applied, the motion planner 41 proceeds on to step ST8. The motion planner 41 judges at step ST8 if the robot can stably transfer to the motion by next motion command from a robot's current posture. And if not stably transferable, the motion planner 41 applies complementary motion at step ST9, and after generating complementary motion plan as intermediate motion from a robot's current posture till the initial posture by next motion command, or if stably transferable, then proceeds on to step ST10 and generates motion plan of the motion by next motion command.

Thus, after the motion planner 41 generates motion plan and complementary motion plan, the motion generator 42 generates motion data and complementary motion data based on said motion plan and complementary motion plan, and the controller 43 drive-controls the joint drive motors of a robot's respective joint portions according to said motion data and complementary motion data. And, while the robot conducts the above-mentioned motions, the motion monitor 46 predicts the robot's state based on the robot's posture and the observed ZMP value at step ST10, and judges at step ST11 if acting stably. If acting stably, the robot continues the motion, and the motion monitor 46 judges whether to finish motion or not at step ST12. And said step ST10 to ST12 are repeated till the motion is finished. If motion is finished, the motion monitor 46 controls at step ST13 the motion planner 41, the motion generator 42, and the controller 43, and finishes motion. On the other hand, if not acting stably at step ST11, the motion monitor 46 proceeds on to step ST13, instantly outputs motion termination command to the motion planner 41, and the motion planner 41 stops motion plan, and the robot's motion is finished.

Further at said step ST4, if the motion by next motion command is not practicable motion, the motion planner 41 retrieves the posture data corresponding to the intermediate motion from a robot's current posture till the initial posture of the motion by next motion command from the motion library 41*a*. And at step ST15, if there is not such posture data corresponding to the intermediate motion, the motion planner 41 proceeds on to step ST13, instantly stops motion plan, and the robot's motion is finished. On the other hand, if there is such posture data corresponding to the intermediate motion, the motion planner 41 denotes such intermediate motion by screen display or others on the controller 47 at step ST16, and returns to step ST3.

Thus, as for the biped walking humanoid robot 10 in accordance with embodiments of the present invention, when a motion is conducted by next motion command referring to the robot's current posture and others, such motion impossible to be continuous is not conducted, thereby the robot's various motions are made possible without damaging the robot's stability. Accordingly, a biped walking humanoid robot's continuous, smooth, stable, and firm motion is made possible.

Figure 8:
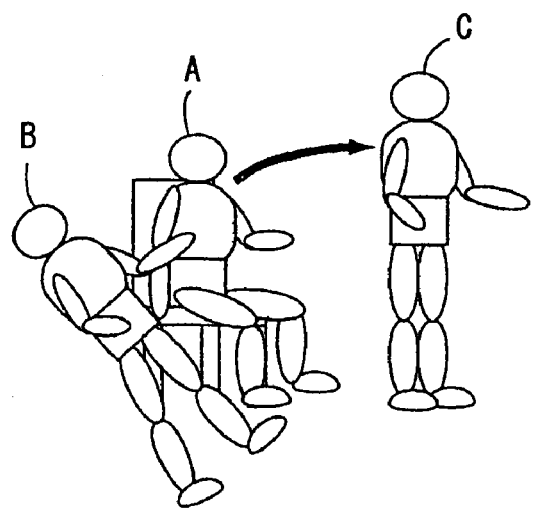
FIG. 8 is a view illustrating an example of the motion of a biped walking humanoid robot shown in FIG. 1.

Next, as shown, for example, in FIG. 8, explanation will be made for the sitting state of the biped walking humanoid robot 10.

Figure 9:
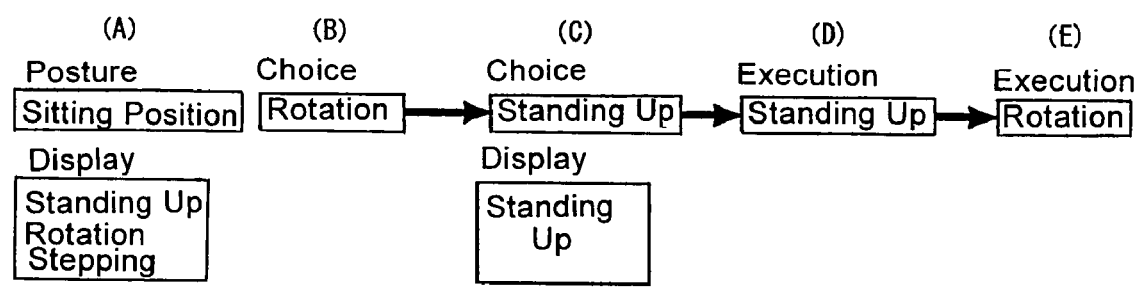
FIG. 9 is a view illustrating in order the robot's posture and indication during the motion of FIG. 8.

The motion planner 41 preferentially denotes the motion previously chosen by an operator on a screen display or others of the controller 47, based on the robot's current posture "sitting position" as shown in FIG. 9(A), as next motion from complementary explanation registered about the robot's sitting position A (See FIG. 8.) from the motion library 41*a*, then followed by "stand up motion, rotational motion, stepping motion" originally registered in the motion library 41*a*. Here, among the list of denoted motions, the motions impossible to conduct are included, and are possible to be chosen forcibly by an operator.

Here, as shown in FIG. 9(B), if rotational motion (indicated with symbol B in FIG. 8) is chosen from the controller 47 by an operator as next motion, the motion planner 41 retrieves the posture data about rotational motion in the motion library 41*a* based on next motion from the controller 47.

And since standing position C is the prerequisite for rotational motion B from complementary explanation of said posture data, the motion planner 41 does not accept this next motion command, and since, for example, stand up motion is required as complementary motion with respect to rotational motion B from sitting position A, the motion planner 41 outputs, as shown in FIG. 9(C), said stand up motion to the controller 47 as complementary motion, and denotes it to its screen display and others.

Here, if an operator chooses stand up motion as said complementary motion by the controller 47, the motion planner 41 records into the history filter 41*b* stand up motion and rotational motion as a series of basic motions about rotational motion from sitting position, and conducts in series stand up motion as shown in FIG. 9(D), and rotational motion as shown in FIG. 9(E).

Here, in case that there are a plurality of complementary motions from a robot's current posture till the motion by next motion command, all complementary motions are denoted on a controller 47 by screen display or others, and an operator can choose any of the complementary motions. In case of a plurality of complementary motions, if no time is left to choose complementary motion to conduct a robot's motion in real time, a complementary motion may be preferably automatically chosen after a certain time in the preferential order pre-determined in advance by off-line.

Here, in case that there is no complementary motion for the initial posture of next motion command, or in case that a robot's stability can not be guaranteed by complementary motion, the motion planner 41 cancels next motion command, and stops conduction of motion.

According to the above-mentioned embodiment, leg portions 12L, 12R have six degrees of freedom, and arm portions 13L, 13R have five degrees of freedom, but not limited as such, they may have less or more degrees of freedom.

Also according to the above-mentioned embodiment, the controller 47 is operated by an operator, but not limited as such, input operation to the controller 47 may be conducted by program command by generic program controlling said controller 47.

INDUSTRIAL APPLICABILITY

According to the present invention as described above, when a biped walking humanoid robot conducts various motions in series, a motion control apparatus detects the robot's current posture and others, and only when next motion command is within the range of stability limit, motion data is generated corresponding to next motion command. Consequently, a motion control apparatus drive-controls the robot's respective portions based on said complementary and motion data, thereby the robot conducts the motion by next motion command from its current posture. Thus, the robot can conduct motions in series smoothly and stably. Also only when next motion command is within the range of stability limit, the robot conducts the motion corresponding to next motion command, and even if an operator to operate the robot is unaccustomed, the suitability and unsuitability of each continued motion are not required to be judged by the operator by combination of various motions by the robot operation, therefore easy operation of complex continuous motion is possible, and thereby conduction of unsuitable motion by wrong operation by the operator can be prevented.

Further, if said motion control apparatus is provided with a motion library storing the posture data of basic motions as the elements of the robot's motions, since various motions are realized by real time combination of basic motions, in case that a robot is actually operated under the same circumstance as human beings, that is, the circumstance where the predicted conditions and reality do not necessarily agree because the circumstance varies irrelevantly with the robot operation, and also it varies due to the robot's own action, the robot can react flexibly to the condition of the case. Further, the volume of calculation by the motion control apparatus is reduced, thereby quick generation of complementary and motion data is possible.

Thus, a quite excellent biped walking humanoid robot is provided in accordance with the present invention, which can conduct various motions in series easily and smoothly.

What is claimed is:

1. A biped walking humanoid robot comprising;
a main body, a pair of leg portions attached thereto at both sides of its lower part so as to be each pivotally movable, each of the leg portions having a knee portion in its midway and a foot portion at its lower end, a pair of arm portions attached to said main body at both sides of its upper part so as to be each pivotally movable, each of the arm portions having an elbow portion in its midway and a hand portion at its lower end, and a head portion attached to the top end of said main body,
drive means pivotally moving pivotally movable joint portions of foot, lower thigh, and thigh portions of said leg portions, and hand, lower arm, and upper arm portions of said arm portions, and
a motion control apparatus drive-controlling respective drive means,
characterized in that;
said motion control apparatus compares, upon conducting various motions in series, the robot's current posture and others including the robot's current posture and dynamic state detected by a detector with next motion command input from outside, and judges if next motion command can be conducted within the range of stability limit with respect to the robot's current posture and others, in case that the motion by next motion command can not be transferred stably, an intermediate motion is inserted, and each drive means is drive-controlled based on said intermediate motion.

2. A biped walking humanoid robot as set forth in claim 1, characterized in that;
said motion control apparatus is provided with a motion library,
the posture data of various fundamental motions as elements of a robot's motion is stored in said motion library,
said posture data includes auxiliary description indicating possible motions to the current posture,
said motion control apparatus judges if next motion command can be conducted within the range of stability limit to the robot's current posture and others, referring to said auxiliary description of each posture data stored in said motion library.

3. A biped walking humanoid robot as set forth in claim 1 or 2, characterized in that;
said motion control apparatus judges if said intermediate motion can be stably transferred from a robot's current posture to the motion by next motion command.

4. A biped walking humanoid robot as set forth in claim 3, characterized in that;
said motion control apparatus judges if said intermediate motion can be stably transferred from a robot's current posture to the motion by next motion command, referring to the auxiliary description of each posture data stored in a motion library.

5. A biped walking humanoid robot as set forth in claim 2, characterized in that;
said motion control apparatus reads out any of various posture data stored in said motion library as said intermediate motion.

6. A biped walking humanoid robot as set forth in claim 1, characterized in that;
said motion control apparatus, if next motion command is out of the range of stability limit with respect to the robot's current posture and others, denotes to outside said intermediate motion.

7. A biped walking humanoid robot comprising;
a main body, a pair of leg portions attached thereto at both sides of its lower part so as to be each pivotally movable, each of the leg portions having a knee portion in its midway and a foot portion at its lower end, a pair of arm portions attached to said main body at both sides of its upper part so as to be each pivotally movable, each of the arm portions having an elbow portion in its midway and a hand portion at its lower end, and a head portion attached to the top end of said main body,
joint drive motors pivotally moving pivotally movable joint portions of foot, lower thigh, and thigh portions of said leg portions, and hand, lower arm, and upper arm portions of said arm portions, and
a motion control apparatus drive-controlling respective joint drive motors,
characterized in that;
said motion control apparatus comprises;
a motion planner judging if a next motion command input from outside is practicable within the range of stability limit, and planning the motion corresponding to the motion command based on the next motion command input from outside;
a motion generator generating angle data of respective joint portions required for a robot's motion based on the motion plan by said motion planner;
a compensator calculating ZMP (Zero Moment Point) target value based on said angle data, and ZMP real value based on the posture information from an angle measurement unit and the detected output from ZMP detection sensor, comparing said ZMP real value with said ZMP target value, and outputting ZMP compensation to said motion generator;
a controller drive-controlling said respective motors based on the modified motion data from said motion generator; and a motion monitor monitoring the robot's state based on said motion plan, ZMP target value, and ZMP real value; and
wherein said motion planner, upon conducting various motions in series, takes up a robot's current posture and others from said motion monitor, as well as compares the robot's current posture and others with the next motion command input from outside, and judges if said next motion command is practicable within the range of stability limit, and if the motion by next motion command can not be stably transferred, motion plan is conducted by inserting a intermediate motion.

8. A biped walking humanoid robot as set forth in claim 7, characterized in that;

the motion command input into said motion control apparatus is conducted with arbitrary motion command chosen by an operator by an outside control system.

9. A biped walking humanoid robot as set forth in claim 7 or 8, characterized in that;

said motion control apparatus is provided with a motion library, the posture data of various fundamental motions as elements of a robot's motion is stored in said motion library, said posture data includes auxiliary description indicating possible motions to the current posture, said motion planner judges if next motion command can be conducted within the range of stability limit to the robot's current posture and others, referring to said auxiliary description of each posture data stored in said motion library.

10. A biped walking humanoid robot as set forth in claim 7 or 8, characterized in that;

said motion planner judges if said intermediate motion can be stably transferred from a robot's current posture to the motion by next motion command.

11. A biped walking humanoid robot as set forth in claim 10, characterized in that;

said motion planner judges if said intermediate motion can be stably transferred from a robot's current posture to the motion by next motion command, referring to the auxiliary description of each posture data stored in said a motion library.

12. A biped walking humanoid robot as set forth in claim 9, characterized in that;

said motion planner reads out any of various posture data stored in said motion library as said intermediate motion.

13. A biped walking humanoid robot as set forth in any one of claims 1, 2 and 5 to 8, characterized in that;

said motion control apparatus is further provided with a history filter as a memory device to record motion command from outside.

* * * * *